Figure 1:
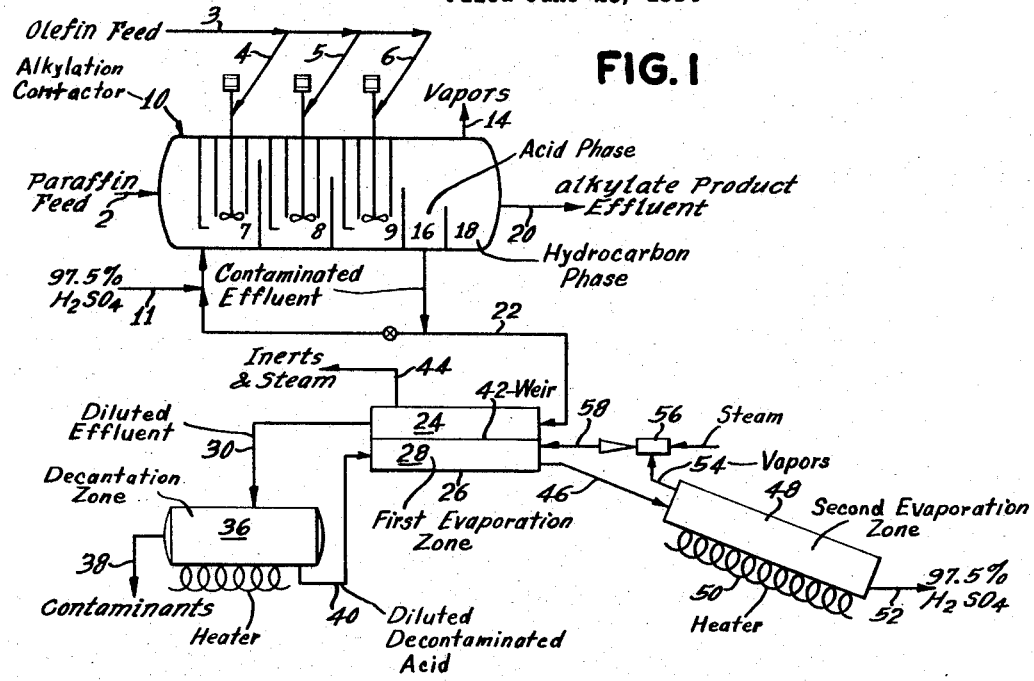

July 25, 1967 M. F. NATHAN ET AL 3,333,019
SULFURIC ACID CONCENTRATION
Filed June 25, 1964

INVENTORS
Marvin F. Nathan
George C. Grubb

John C. Quinlan ATTORNEY
Marilyn J. Maue AGENT

United States Patent Office 3,333,019
Patented July 25, 1967

3,333,019
SULFURIC ACID CONCENTRATION
Marvin F. Nathan, New York, N.Y., and George C. Grubb, Little Silver, N.J., assignors to Pullman Incorporated, Chicago, Ill., a corporation of Delaware
Filed June 25, 1964, Ser. No. 377,908
20 Claims. (Cl. 260—683.62)

This invention relates to an improved method for concentrating "spent" sulfuric acid obtained from an alkylation process.

Commercial sulfuric acid alkylation processes require the use of acid in an extremely high state of purity. In order for the sulfuric acid to be effective as a catalyst in such a process, the acid fed to the alkylation zone must be in a concentration of 97.0 percent by weight or higher. Generally, during alkylation, the concentration of sulfuric acid is allowed to fall off to between about 90 and 96 percent before it is withdrawn from the alkylation zone. This acid is regarded as "spent" insofar as the alkylation reaction is concerned and must be reconcentrated up to at least 97 percent before it can be effective as make-up for the reaction. Various methods have been proposed and used commercially to reconcentrate this acid; however, these processes have been found to be highly inefficient and extremely expensive to operate.

Regeneration of "spent" sulfuric acid from alkylation is complicated by the fact that certain hydrocarbon impurities such as sulfate esters formed during alkylation, remain in the acid phase removed from the alkylation reactor. These impurities must be removed before the acid is returned to the reaction zone since their presence markedly lowers the selectivity and yield to the desired alkylate product.

Removal of these impurities normally involves dilution of the acid with water, and subsequent reconcentration of the acid. It is well known from the vapor-liquid equilibrium data for sulfuric acid and water that, as the acid is concentrated above about 93 weight percent, an increasing amount of acid is found in the vapor. The amount of acid found in the vapor phase is drastically multiplied as the acid is concentrated above about 95 percent, until the constant boiling mixture is reached at about 98 percent acid. Therefore, there is considerable inefficiency in processes normally used to concentrate acid above about 93 percent. In these processes, acid in the vapor phase must be recovered by condensing and recycling the acid condensate to the evaporator.

It is also well known that the temperature required to evaporate the water is reduced as the pressure is lowered on the solution being concentrated. Due to limitations imposed by materials of construction, it is desirable to maintain temperatures below about 450° F. in the concentration apparatus of commercial processes used in reconcentrating sulfuric acid. However, normal barometric condensers are limited to approximately 30-50 mm. Hg by available water temperatures. It has therefore been found difficult to economically achieve pressures low enough to permit concentration of the acid above 94-95 percent without exceeding the temperature limit.

Because of these difficulties in reconcentration of the acid, it is usual to concentrate the acid only to 93-94 percent. Acid of this concentration contains several times the permissible concentration of water. To achieve the higher concentration, e.g., about 97 percent, required before the acid can be reused in alkylation, it is necessary to supply a portion of fresh concentrated acid, usually as oleum or $SO_3$. Since the system can tolerate only a fixed amount of water and since concentrations lower than 97 percent have considerably more water than is permissible, acid concentrations lower than 97 percent produce an uneconomical excess of acid when fortified with $SO_3$.

Therefore, an appreciable portion of the operational cost of sulfuric alkylation is chargeable to the replacement or regeneration of the spent alkylation acid.

It is, therefore, an object of the present invention to overcome the deficiencies and disadvantages discussed above and to provide a process which is highly efficient and commercially feasible for the concentration of "spent" sulfuric acid in an alkylation process.

Another object of this invention is to provide an economical and commercially feasible process for reconcentration of "spent" sulfuric acid for reuse in the alkylation of olefins.

These and other objects will become apparent to those skilled in the art from the accompanying description and disclosure.

In the alkylation reactions of the present process, an isoparaffin, for example, a $C_4$ or $C_5$ paraffin, is reacted with a $C_2$ to $C_5$ olefin, for example, propylene or isobutylene in the presence of sulfuric acid as a catalyst to provide the alkylate product. However, during the reaction there are formed by-products such as those resulting from the reaction of the olefin with the sulfuric acid, for example, the sulfuric esters of the alkyl moieties from reactants in the reaction. The acid catalyst becomes diluted with organic impurities in the reaction zone to a concentration below about 96 percent before it is withdrawn. After reaction, the hydrocarbon product and acid phases are separated; however, the acidic by-products or impurities of the reaction are retained in the acid phase. Before the spent acid, namely the acid phase removed from the alkylation reactor, can be reconcentrated for use, the contaminating by-products together with any entrained hydrocarbon and inert material, must be removed. This is generally accomplished by diluting the spent acid with water to an acid concentration of between about 30 and about 85 weight percent acid, preferably between about 50 and about 70 weight percent acid and decanting the organic materials and any other contaminant, from the acid or by oil washing the spent acid followed by decantation.

As stated above, spent acid of the alkylation process contains, as contaminants, the products and/or by-products of the reaction obtained from the alkylation of an isoparaffinic hydrocarbon with an olefinic hydrocarbon in the presence of sulfuric acid catalyst at a temperature ranging from about 15° F. to about 100° F., preferably from about 30° F., to about 75° F. at a pressure of from about 1 atmosphere to about 50 p.s.i.g., preferably from about 1 atmosphere to about 30 p.s.i.g. In general, the preferred isoparaffin is isobutane, however, higher members of this homologous series such as isopentane can also be employed. The olefinic material of the alkylation reaction contains from two to five carbon atoms and can be a mono-olefinic or a di-olefinic compound; however, the preferred olefins comprise propylene and butylenes. The paraffin and olefin are reacted in a mixing zone of an alkylation chamber and when the desired conversion has taken place, the liquid product effluent is withdrawn and separated by settling or centrifuging into an acid phase and a hydrocarbon phase. The hydrocarbon phase is treated to recover alkylate in a series of distillation steps and a portion of the acid phase is recycled to the reaction zone. Fresh acid make-up of at least 97 percent is used to replace the portion of spent acid removed from the system.

The acid when it is removed from the alkylation zone generally contains small amounts of inert gases which enter the process in feed streams and which comprise carbon monoxide, nitrogen and oxygen. The acid phase also contains organic compounds such as the neutral or acidic sulfate esters formed during alkylation such as, for example, butyl hydrogen sulfate and dibutyl sulfate and may also contain small amounts of entrained, unreacted hydrocarbon compounds. With the dilution effect of these contaminants, the acid phase has an acid concentration of between about 90 and about 96 percent by weight.

According to this invention, the spent acid from alkylation is diluted, decontaminated, and the resulting dilute sulfuric acid solution containing 15 percent or more water, preferably containing from about 30 to about 50 weight percent water, is concentrated by introducing the dilute sulfuric acid solution into a vaporization zone maintained under a vacuum. The vaporization zone is preferably maintained under a vacuum of from about 15 mm. Hg to about 150 mm. Hg, most preferably from about 25 mm. Hg to about 75 mm. Hg, and at a temperature between about 290° F. and about 450° F., most preferably between about 320° F. and about 370° F. Under these conditions, water is evaporated from the dilute sulfuric acid solution to raise the acid concentration to at least about 90 percent. The evaporated water vapor is absorbed and condensed in the spent acid withdrawn from the alkylation zone having an initial concentration of from about 85 to about 96 percent by weight acid. The spent acid is diluted to a concentration within the range of from about 85 to about 30 percent by weight acid, preferably within the range of from about 70 to about 50 percent by weight acid and the contaminants which separate in an organic layer are preferably removed by decantation. The decontaminated dilute acid is then introduced into the vaporization zone as the dilute acid to be concentrated to at least 90 percent by weight acid. The acid of at least 90 percent acid concentration is then passed to a final concentrating zone or second vaporization zone operated under a high vacuum than that employed in the first vaporization zone. In the second vaporization zone, the pressure is maintained between about 0.5 mm. Hg and about 15 mm. Hg, preferably between about 0.5 mm. Hg and about 8 mm. Hg; and a suitable vaporization temperature is employed, for example from about 280° F. to about 430° F., preferably from about 300° F. to about 400° F. to effect the concentration of sulfuric acid to a water content below about 0.5 percent, if desired.

Table I below illustrates the approximate directional effect of temperatures on pressures which can be used in the first and second vaporization zones.

TABLE I

| Pressure, mm. Hg | 90% Acid, Boiling Point, ° F. | Pressure, mm. Hg | 97.5% Acid, Boiling Point, ° F. |
|---|---|---|---|
| 15 | 297 | 0.5 | 282 |
| 25 | 315 | 1.0 | 307 |
| 75 | 367 | 5.0 | 372 |
| 150 | 402 | 7.0 | 387 |
| | | 10.0 | 403 |
| | | 15.0 | 423 |

In the final concentrating zone, water is evaporated from acid of incrementally increasing concentration so that a proportionately low volume of vapors high in acid concentration is removed in this zone. The vapors from the final concentrating zone are mixed with the spent acid prior to decontamination to effect dilution of the spent acid.

The vapors from the final concentrating zone can be compressed, for example, with a steam jet, to the proper pressure level, and mixed with the vapors from the first absorption zone to be absorbed and condensed in the spent alkylation acid as described above. When it is desired to avoid compression of these vapors, the vapors from the final concentrating zone also can be absorbed and condensed in the spent alkylation acid without compression, preferably using the alkylation spent acid, or a portion of it, before use of the spent acid to absorb and condense the vapors from the first vaporization zone. It is also possible to use decontaminated and reconcentrated acid, e.g., the 90 percent acid from the first vaporization zone or the 97.5 percent acid from the final vaporization zone to absorb or condense the vapor from the final vaporization zone followed by recycle of the resulting diluted acid to the appropriate zone. Thus, the vapors from the final concentration zone are either mixed directly with the spent acid from the alkylation zone or are mixed with the vapors from the first vaporization zone and then combined with the spent acid prior to decontamination.

It is to be understood, however, that either or both of the vaporization zones can comprise one or more stages for incrementally increasing the concentration of the acid. This incremental increase in the acid concentration is most necessary in the final concentrating zone where the liquid acid is approaching the constant boiling mixture. The final concentrating zone can comprise a series of separate flashing zones, however, the preferred operation involves the use of a falling film evaporator wherein the liquid acid flows through an elongated heated chamber and is continuously and differentially concentrated by evaporation of vapors from acid of gradually increasing concentration. If desired, the contaminated spent acid can be passed through a barometric condenser or spray tower, or passed through the falling film evaporator in a separate stream to serve as an absorption medium for the vapors liberated from the acid being concentrated during the evaporation operation. The spent acid is maintained at a lower temperature than the hot concentrated acid. By this method of combining a first and a second vaporization stage, acid solution containing 15 percent or more water can be concentrated up to about 98 weight percent sulfuric acid or higher.

A novel embodiment for carrying out the first vaporization stage of the present process comprises introducing the dilute acid, preferably containing from about 50 to about 30 percent water into the first vaporization zone provided with two distinct chambers, namely an evaporation chamber and an absorption chamber, each maintained at a different temperature. The dilute acid is introduced into the evaporation chamber and the contaminated spent sulfuric acid solution from alkylation is introduced into the absorption chamber of the vaporization zone. The spent acid which is maintained at a lower temperature than that of the dilute sulfuric acid solution to be concentrated, acts as a water-absorption solution. The contaminated sulfuric solution is fed to the absorption chamber at a concentration of from about 90–96 percent acid. In the evaporation chamber, the dilute sulfuric acid solution is preferably passed countercurrent to the water-absorption solution, so that water, which is vaporized from the dilute sulfuric acid solution, is passed directly into and condensed by the cooler water-absorption solution, preferably at a pressure drop of less than 5 mm. Hg.

This novel vaporization zone preferably comprises an elongated tank divided lengthwise by an insulated partition which extends slightly above the level of the liquids, but terminates below the top of the tank to allow a common vapor space above two streams of sulfuric acid flowing in the separate chambers of the zone. The feeds of dilute sulfuric acid flowing on one side of the partition in the evaporation chamber of this zone and the spent contaminated acid solution flowing on the opposite side of the partition in the absorption chamber of this zone are regulated so that liquid is prevented from overflowing the partition. Temperature controlling means are located on either or both sides of the partition to maintain the dilute sulfuric, more often at a temperature higher than the spent acid solution. This zone is maintained under a pressure of from about 25 mm. Hg. to about 150 mm. Hg. and at solution temperatures which provide a driving force for transfer of the vapors into the spent acid.

The condition that must be maintained in this zone is a vapor pressure on the evaporation side which exceeds the vapor pressure on the condensation side. In the single stage concentration of the dilute acid to about 90 percent, the spent acid is preferably maintained at a temperature between about 60° F. and about 180° F. to prevent carbonization, while the dilute sulfuric solution to be concentrated is maintained between about 300° F. and about 380° F. It is to be understood, however, that there can be one or more evaporation chambers which are used in conjunction with one or more absorption chambers to comprise the first vaporization zone. However, it is to be understood that in apparatus having a plurality of stages, a lower temperature difference between the two solutions is usually maintained. More usually, with a plurality of stages, a temperature difference of at least 5° between the two solutions is recommended, or a difference necessary to overcome the resistance to diffusion of the inerts in the vapors to provide a practical rate of transfer in accordance with the concentration differences of the two solutions. The water evaporated from the dilute decontaminated acid being concentrated is absorbed and condensed in the spent acid and serves to provide the necessary dilution prior to removal of contaminants.

Whenever necessary, the spent acid solution can be additionally diluted by controlled addition of water from an outside source or preferably from a recycle stream of the present process hereinafter described. Vapors which are not condensed and which comprise inert materials in the spent acid and excess water that must be removed from the system, are vented from the vaporization zone and the remaining spent acid medium, which has absorbed water from the dilute sulfuric solution, is adjusted to a concentration of from 30 to 85 percent, preferably from 50 to 70 percent by weight acid. Substantially all of the remaining contaminants, e.g., acid and neutral hydrocarbons, contained therein are removed by decantation and/or by other suitable means such as by heating to promote the release of the hydrocarbons. The decontaminated solution containing 15 percent by weight or more of water, preferably containing from 30 to 50 percent water, is then passed into said evaporation chamber of the first vaporization zone as the dilute sulfuric acid solution to be concentrated. In the above process, steam jets are conveniently used to take off inerts and/or excess water and other vapor contaminants.

By utilizing the spent acid being diluted to absorb and condense the water vapors from a sulfuric solution being concentrated, a more efficient operation and a more economical means of separating non-volatile contaminants from sulfuric acid by dilution is achieved. After removing the hydrocarbon and/or inert contaminants, for example, by dilution and decantation, the diluted, decontaminated solution is concentrated in the general manner set forth above for the sulfuric acid solution containing 15 percent or more water. However, when the dilute sulfuric acid solution contains more than 25 percent water, it is recommended that the concentration up to 93 percent acid be carried out in two or more stages in the first vaporization zone, for example, by employing a plurality of vaporizers operated in series at increasingly higher temperatures. In the preliminary vaporization stages of the first vaporization zone, the temperature at which the acid being concentrated can be as low as about 150° F., while the temperature of the spent acid is adjusted accordingly to provide the necessary vapor pressure difference between the two solutions to effect condensation of vapors. For example, the spent acid can be maintained at about 130° F. when the acid being concentrated is at a temperature of 150° F. in the preliminary stages of the vaporization.

The acid product of the above described process containing up to 93 percent acid can be recovered as the final product of the process or can be recycled as alkylate acid after adjusting its concentration to about 97 or 98 percent acid, either by addition of oleum or by further treatment as set forth hereinafter in the second vaporization stage of the present process.

The above described method of concentrating the dilute sulfuric acid in the vaporization zone is most economically employed only up to about 93–94 weight percent acid. At higher concentrations, it is desirable to maintain lower pressures in the evaporation zone to avoid excessive temperatures. Moreover, up to 93 weight percent acid in the liquid phase, the vapor in equilibrium with the liquid is predominantly water. Above 93 percent acid concentration, however, the acid content in the vapor increases at a disproportionately greater rate until at atmospheric pressure, both the liquid and vapor are of the same composition, at about 98.3 percent acid concentration; at 97.5 percent acid in the liquid, for example, the vapor contains about 85 percent acid. Consequently, in the concentration of acid by evaporation above 93–94 percent, a substantial portion of the acid itself is vaporized along with the water unless a large number of vaporization zones are used or water is evaporated from acid of incrementally increasing concentration so that a proportionally low volume of vapors high in acid content is removed.

Therefore, according to the present process, a further advantage and improvement is realized in finally concentrating the 90–94 percent acid produced in the first evaporation zone to an acid above about 97 percent concentration for reuse in the alkylation reaction or as a final product of the process.

The improvement of the additional concentrating is accomplished by passing the sulfuric acid solution which has been partially concentrated, i.e., to about 90 percent by weight acid concentration, through a final concentrating zone or second vaporization zone which utilizes continuous evaporation of water from sulfuric acid of gradually increasing concentration. The final concentration zone can comprise a plurality of exchangers and flash chambers operated in series, where the flash chambers are maintained at a pressure of from 0.5 mm. Hg to 15 mm. Hg, but preferably from about 0.5 mm. Hg to about 8 mm. Hg. The acid to be concentrated is passed through the first exchanger when it is heated to between 300° F. to 450° F., but preferably to between 350° F. and 400° F. The acid then passes to the first flash drum where a portion of the liquid vaporizes. The liquid then passes through the second exchanger to the second flash drum, and in a similar manner, through the rest of the zone. It is recommended that at least six heat exchangers and six flash chambers be used in the series. In a preferred method of operation, the final concentrating zone is a falling film evaporator comprising an elongated zone which is inclined to allow the acid of about 90 percent concentration to flow from the top of said zone downwardly to the outlet, while being concentrated and heated by indirect heat exchange conveniently supplied from steam coils located below the liquid path of flow along the base of the elongated final concentrating zone. The temperature in the final concentrating zone is maintained between about 280° F. and about 430° F., preferably between about 300° F. and about 400° F., such that water is vaporized from the liquid sulfuric into a vapor space maintained under a pressure of from 0.5 mm. Hg to about 15 mm. Hg, most preferably from 1 mm. Hg to 7 mm. Hg.

In its downward passage through the final concentrating zone, the sulfuric acid solution is continuously and differentially evaporated to remove remaining portions of water from the acid. Because of the differential evaporation, the concentration of acid in the vapors is maintained at a minimum since the infinite number of evaporation sites from liquid of progressively higher acid concentration provides only a proportionately small volume of the vapors of high acid concentration. The final concentrating step can also be accomplished by employing a plurality of separate evaporating or distillation zones operated in series.

At the outlet from the differential concentrating zone, or from the last concentrating zone in a series of flashing stages, sulfuric acid of above about 97 percent by weight acid can be withdrawn. The vapors under the high-vacuum of the final concentrating zone do not have as high an acid concentration as the vapors obtained at a higher pressure. This tendency for the concentration of acid in the vapors to decrease with increasing vacuum provides the present high vacuum process with a distinct advantage over processes previously employed, in that the presence of acid in the vapor phase is greatly reduced. Furthermore, the acid recovery is substantially complete in the present process which provides for internal recycle of vapors from which acid is ultimately recovered. The vapors which are recycled in the present process are utilized in the important function of providing the dilution of spent sulfuric acid necessary for decontamination.

The water and acid vapor formed in the final concentration zone is recycled to the first vaporization zone to recover the acid content and to aid in the dilution of the spent acid. This is conveniently achieved by absorbing or condensing the vapors in at least a portion of the spent alkylation acid before it is diluted in the evaporation chamber, or by compressing the vapors with a steam jet and mixing them with the vapors from the evaporation chamber to be absorbed and condensed in the spent alkylation acid.

Generally, when the pressure of operation of the final concentrating zone is below 7 mm. Hg, condensation of the vapors in at least a portion of the spent alkylation acid is the preferred method of operation because of the expense of compressing the vapors to the higher pressure of the first evaporation zone. Spent alkylation acid may be circulated in a barometric condenser, for example, and partially diluted with the vapors from the final vaporization zone and then sent to the first vaporization zone for further dilution.

The accompanying drawings are provided to illustrate specific embodiments of the present process and are not to be construed in any way limiting to the scope of the invention.

FIGURE 1 illustrates the present process with the use of the novel two-chamber first vaporization zone. In accordance with the drawing, isoparaffin from line 2 is contacted with isobutylene from lines 3, 4, 5 and 6 in reaction zones 7, 8 and 9 of alkylation contactor 10 in the presence of 97.5 percent sulfuric acid catalyst introduced into the reaction zones through lines 11. The reactants are conducted through a series of three reaction zones each containing a mixer to provide better contact and the operating conditions maintained within the reaction zone, under which reaction takes place, is 60° F. and 15 p.s.i.g. Under these conditions, a portion of the lighter hydrocarbons are vaporized and removed from the reaction zone by means of line 14. The remaining liquid portion of the reaction mixture, containing alkylate product, is withdrawn from the last reaction zone of the series and is separated into an acid phase and a hydrocarbon phase in chambers 16 and 18 respectively of the alkylation contactor. Liquid alkylate product effluent is withdrawn from chamber 18 by means of line 20. This liquid is treated in a series of distillation steps to recover alkylate product.

About 2600 pounds per hour of 94 percent spent sulfuric acid containing organic and inorganic contaminants is withdrawn from chamber 16 by means of line 22. This spent acid contains traces of inert gases such as carbon monoxide, oxygen and nitrogen which have entered the system in the paraffin and olefin feeds and also about 3 weight percent of hydrocarbon impurities such as mono- and dibutyl sulfates, unreacted isobutane and lower boiling hydrocarbons. The spent acid from line 22 is introduced into elongated absorption chamber 24 of the first vaporization zone 26 and is maintained therein at a temperature of 140° F. under a pressure of 50 mm. Hg. Vaporization zone 26 is an elongated zone divided lengthwise to provide two chambers by means of an insulated partition or weir 42 which extends above the liquid level in the chamber and which terminates at a point below the top of said chamber to provide a common vapor chamber above the liquids. The temperatures in chamber 24 and in chamber 28 are carefully and separately maintained by means of heating and cooling coils or by another similar temperature control device.

The spent acid passing through chamber 24 and being withdrawn by means of line 30 is diluted with water to an acid concentration of about 60 weight percent. This material is then passed through a heater into decantation zone 36, wherein at a temperature of 230° F., hydrocarbon contaminants are removed at a rate of about 80 pounds per hour by means of line 38. The remaining contaminated, dilute acid, i.e., about 4100 pounds of 60 percent by weight aqueous sulfuric acid is withdrawn from decantation zone 36 by means of line 40 and pumped into evaporation chamber 28 of vaporization zone 26 to flow in a counter-current direction from the liquid passing through chamber 24. The dilute acid in chamber 28 is maintained at 350° F. to provide the driving force necessary for vaporizing water from the dilute acid. The vapors pass over weir 42 and are condensed by the cooler spent acid liquid in chamber 24. Uncondensed material is vented from zone 26 by means of line 44.

The acid solution withdrawn from chamber 28 by means of line 46 is thus concentrated to 90 percent by weight acid. This material is fed into an elongated tubular final concentrating zone 48 consisting of a second vaporizing zone provided with heating coils 50 to raise the temperature therein to about 390° F. In zone 48, the pressure is maintained at 7 mm. Hg and the 90 percent acid is differentially evaporated along its path of flow until it reaches a concentration of 97.5 weight percent acid at the outlet of said zone where it is withdrawn by means of line 52. The concentrated acid in line 52 can then be recycled to the reaction zones of contactor 10, if desired. The water vapors which are continuously being evaporated from the acid in the concentrating zone rise and are discharged from zone 48 by means of line 54. These vapors with the aid of a steam jet 56 are compressed to 50 mm. and passed by means of line 58 to be admixed with the vapors in first vaporization zone 26.

As an alternate to this treatment of vapors from the final concentrating zone 48, which avoids compression of vapors, the spent acid in line 22 can be passed into concentrator 48 as a separate reservoir of water absorption medium in a manner similar to spent acid in chamber 24 of first vaporization zone 26. In this way, the vaporized material is absorbed and condensed by the spent acid during the concentrating operation and the resulting spent acid mixture is passed to chamber 24 of first vaporization zone 26 by means of line 32, thus by-passing steam jet 56 which is used only for the removal of inerts.

Figure 2:
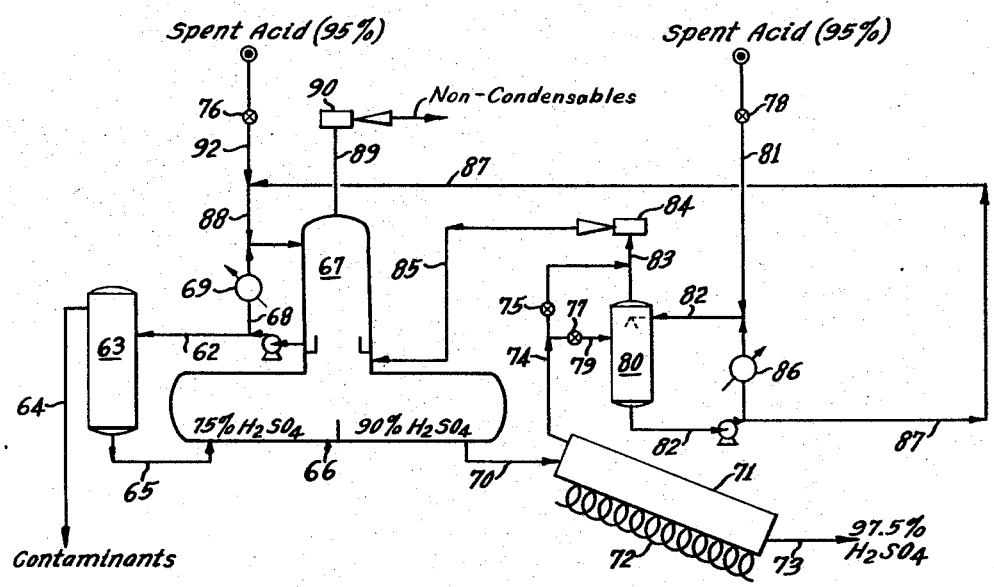

FIGURE 2 illustrates another embodiment of the process of the present invention which also utilizes the vapors evaporated during concentration as diluents for the spent sulfuric acid prior to decontamination. According to this embodiment, 6000 pounds per hour of 45 percent sulfuric acid containing contaminants is fed by means of line 62 through a heater into decantation zone 63 wherein at a temperature of 200° F., the liquid settles into a hydrocarbon layer and an acid layer. The hydrocarbons which are the contaminants are withdrawn from zone 63 by means of line 64, while the acid layer at a concentration of about 45 percent is fed by means of line 65 into a first vaporization zone 66. In vaporization zone 66 under 50 mm. Hg, the acid is evaporated in two stages, first to a concentration of about 75 percent acid and then to a concentration of about 90 percent acid. This is accomplished by pumping the dilute 45 percent acid into the bottom of the first of two chambers separated by a weir and allowing liquid in the first chamber which has been concentrated to about 75 percent by evaporation at 230° F. to overflow said weir and enter the second chamber where it is concentrated to about 90 percent at a slightly higher temperature. The vapors of both chambers rise into the vapor section 67 of the first evaporating zone 66 wherein they are absorbed and condensed in a stream of spent acid which is continuously circulated through section 67 at a rate of 365,000 pounds per hour by means of line 68 after adjusting the temperature of the spent acid to 90° F. in cooler 69. The circulating stream of sulfuric acid is diluted to about 45 percent acid by absorption of vapors. A major portion of this stream in line 68 is passed to decantation zone 63 by means of line 62 and the liquid withdrawn from line 68 is replaced by spent acid from line 88. Vapors which are not condensed or absorbed in the spent acid stream are removed from section 67 by means of line 89 and vented from the system through steam jet 90.

The sulfuric acid in zone 66 which has been concentrated to 90 percent is removed from the second liquid section of vaporization zone 66 and passed by means of line 70 into falling film evaporator 71 maintained at a pressure of about 1 mm. Hg and heated to a temperature of 310° F. by means of heating coil 72. In its downward passage through zone 71, the 90 percent acid is continuously and incrementally concentrated to 97.5 percent and is finally withdrawn from zone 71 by means of line 73 as the concentrated acid product of the process.

The vapors in zone 71 rise to the top of the falling film evaporator, or second vaporization zone, and are withdrawn by means of line 74. According to one embodiment at this stage of the process, valves 75 and 76 are closed and valves 77 and 78 are opened to permit flow therethrough; the vapors from zone 71 are passed by means of lines 74 and 79 into a barometric condenser 80 wherein at a temperature of 140° F. under 1 mm. Hg, a portion of the vapors are condensed and absorbed in spent acid entering the barometric condenser by means of lines 81 and 82. The vapors which are not condensed in zone 80 are passed upwardly through line 83 into jet 84 and recycled to the first evaporating zone 66 by means of line 85. The liquid in zone 80 is withdrawn by means of line 82 and the greater portion, together with spent acid from line 81, is recycled to zone 80 after passing through cooler 86 wherein the temperature of the recycle stream is adjusted to 90° F. The remaining portion of liquid, about 3000 pounds per hour is recycled to vapor section 67 of the first vaporization zone 66 by means of lines 87 and 88.

According to another embodiment at this stage of the process, valves 77 and 78 are closed and valves 75 and 76 opened to permit flow therethrough. According to this scheme, the vapors withdrawn from the second evaporating zone 71 are passed directly to steam jet compressor 84 and recycled to zone 66 by means of line 85. The spent acid enters the system through line 92 avoiding precontact with the vapors from the second vaporization zone and is directly contacted with vapors in section 67 of the first vaporization zone 66 without any previous water dilution.

By carrying out the steps outlined above, i.e., decontamination and evaporation in a plurality of stages, an acid having a water content of 0.8 weight percent was obtained. In this case, the final concentrating zone was operated at an upper temperature of 345° F. and under a vacuum of 4 mm. Hg to provide this highly concentrated sulfuric acid product.

While FIGURE 2 illustrates two economically feasible methods of handling vapors formed in their respective evaporating zones, it is to be understood that other modifications and changes suggested by the drawing and description of the present process are within the scope of this invention.

The present method of reconcentrating sulfuric acid can also be applied to upgrading dilute aqueous sulfuric acid solutions of, for example, from 30 to 65 percent acid concentration or to regenerating spent sulfuric acid below 80 percent acid concentration, which acid has been used in treating hydrocarbons such as kerosenes or lube oils.

Having thus described our invention we claim:

1. A method for concentrating spent sulfuric acid containing organic contaminants from an alkylation reaction which comprises: diluting the spent, contaminated acid with water vapor to a concentration of from about 30 to about 85 percent by weight acid; removing contaminants from said diluted acid; evaporating water from the resulting dilute, decontaminated acid in a first vaporization zone under a pressure of from about 15 mm. Hg to about 150 mm. Hg; contacting vapors from the first vaporization zone with contaminated spent acid for absorption and condensation of the vapors therein to dilute said spent acid; passing the sulfuric acid which has been concentrated in the first vaporization zone to a second vaporization zone and evaporating water from the acid by incrementally increasing the concentration of the acid under vacuum of from about 0.5 mm. Hg to about 15 mm. Hg; mixing the resulting vapors from said second vaporization zone with spent acid prior to decontamination to dilute said spent, contaminated acid and withdrawing regenerated, decontaminated sulfuric acid from the second vaporization zone.

2. A method for concentrating spent sulfuric acid containing organic contaminants from an alkylation reaction which comprises: diluting the spent, contaminated acid with water to a concentration of from about 30 to about 85 percent by weight acid; removing contaminants from said diluted acid; evaporating water from the resulting dilute, decontaminated acid in a first vaporization zone under a vacuum of from about 15 mm. Hg to about 150 mm. Hg to a concentration of at least 90 percent by weight of acid; contacting vapors from the first vaporization zone with contaminated spent acid for absorption and condensation of the vapors therein to dilute said spent acid; passing the acid concentrated to at least 90 percent by weight to a second vaporization zone and evaporating water from the acid by incrementally increasing the concentration of the acid under a vacuum of from about 0.5 mm. Hg to about 15 mm. Hg; mixing the resulting vapors from said second vaporization zone with spent acid prior to decontamination to dilute said contaminated acid and withdrawing decontaminated sulfuric acid of greater than 96 percent purity from the second vaporization zone.

3. A method for concentrating spent sulfuric acid containing organic contaminants from an alkylation reaction which comprises: under vacuum of from about 15 mm. Hg to about 150 mm. Hg in a vaporization zone, separately passing a stream of spent contaminated sulfuric acid with a stream of decontaminated sulfuric acid to be concentrated having a concentration of from about 30 to 85 percent by weight acid; maintaining the stream of spent contaminated acid below at a vapor pressure below the vapor pressure of the decontaminated acid stream; evaporating water from the decontaminated acid until a concentration of at least 90 percent by weight acid is attained and allowing the vapors resulting from said evaporation to pass into the spent acid at a pressure drop not greater than 5 mm. Hg for absorption and condensation therein; diluting the contaminated acid with water vapor to between 30 and about 85 percent by weight acid; removing organic contaminants from said acid; passing the decontaminated acid as the acid to be concentrated into the vaporization zone separate from the contaminated spent acid and recovering sulfuric acid of at least 90 percent by weight from the vaporization zone.

4. The process of claim 3 wherein acid to be concentrated by evaporation has a concentration of from about 50 to about 70 weight percent acid and the concentration to an acid of at least 90 percent concentration is effected in a plurality of stages wherein the above operation is repeated in each stage.

5. In an alkylation process wherein a paraffin is reacted with an olefin in the presence of sulfuric acid as a catalyst in an alkylation zone, the sulfuric acid catalyst becomes spent as it is contaminated with organic by-products during the course of the reaction, and the sulfuric acid is withdrawn when it reaches a concentration less than 96 percent by weight acid, the improvement for regenerating the spent acid which comprises: passing the spent acid from an alkylation zone in contact with water vapors from a vaporization zone; diluting the spent acid with water vapor to an acid concentration of from 30 to 85 percent by weight and separating the organic contaminants from the resulting diluted acid; passing the decontaminated diluted acid through said vaporization zone; continuously vaporizing water from the diluted, decontaminated acid under vacuum; condensing these vapors in the contaminated spent acid and withdrawing decontaminated sulfuric acid of at least 90 percent acid concentration from said vaporization zone.

6. In an alkylation process wherein a paraffin is reacted with an olefin in the presence of sulfuric acid as a catalyst in an alkylation zone, the sulfuric acid catalyst becomes spent as it is contaminated with organic by-products during the course of the reaction, and the sulfuric acid is withdrawn when it reaches a concentration less than 96 percent by weight acid, the improvement for regenerating the spent acid which comprises: passing the spent acid from said alkylation zone in contact with water vapors from a vaporization zone; diluting the spent acid with water vapor to an acid concentration of from 50 to 70 percent by weight to form a contaminant phase and a dilute acid phase and decanting the contaminant phase from the resulting diluted acid; passing the decontaminated diluted acid through said vaporization zone; continuously vaporizing water from the diluted, decontaminated acid under vacuum of from about 15 mm. Hg to about 150 mm. Hg; condensing these vapors in the contaminated spent acid; withdrawing decontaminated sulfuric acid of at least 90 percent acid concentration from said vaporization zone and introducing said acid into a second vaporization zone; in said second vaporization zone concentrating the acid by continuously evaporating water from the acid of gradually increasing concentration until the liquid sulfuric acid achieves a concentration of at least 96 percent by weight; condensing vapors formed in said second vaporization zone in said contaminated spent acid to provide dilution necessary for decontamination and recovering liquid acid from the second vaporization zone as the product of the process.

7. The process of claim 6 wherein the second vaporization zone comprises a plurality of flashing zones operated in series for the purpose of removing water from the acid solution whose concentration increases in each of the flashing zones.

8. The process of claim 6 wherein the second vaporization zone comprises a falling film evaporator wherein the concentration of the acid increases along its path of flow in said evaporator by continuous evaporation of water vapor.

9. In an alkylation process wherein an isoparaffin is reacted with an olefin in the presence of sulfuric acid catalyst in an alkylation zone, the sulfuric acid becomes spent as it is contaminated with organic by-products ond hydrocarbons during the course of the reaction and the spent sulfuric acid is withdrawn when it is deactivated at a concentration less than 96 percent by weight acid, the improvement for regenerating the acid catalyst which comprises: passing the contaminated spent acid from the alkylation zone to an absorption chamber of a first vaporization zone maintained under a pressure of from about 15 mm. Hg to about 150 mm. Hg; diluting the spent acid with water vapor to a concentration of from about 30 to about 85 percent acid and separating by decantation the organic contaminants from the resulting dilute acid; passing the decontaminated dilute acid through a separate evaporation chamber of said first vaporization zone at a temperature higher than that of the spent acid in said absorption chamber; continuously vaporizing water from the decontaminated dilute acid to raise its concentration to at least 90 percent acid and condensing these vapors in the spent acid in the absorption chamber; in a separate second vaporization zone, continuously vaporizing water from the decontaminated acid of at least 90 percent concentration under a vacuum of from about 0.5 mm. Hg to about 15 mm. Hg until said acid reaches a concentration of at least 96 percent; condensing the vapors from the second vaporization zone with contaminated spent acid to provide dilution of said contaminated acid and recovering the acid of at least 96 percent purity from the second vaporization zone as the product of the process.

10. The process of claim 9 wherein the first vaporization zone comprises adjacent elongated chambers and a controlled liquid level in each of the chambers with a common vapor space above the chambers and wherein the spent contaminated acid is passed through the absorption chamber countercurrent with respect to the dilute, decontaminated acid in the evaporation chamber.

11. The process of claim 9 wherein the evaporation chamber is maintained at a temperature between about 300° F. and about 380° F. and the absorption chamber is maintained at a temperature between about 60° F. and about 180° F. and wherein the vaporous phase is in open communication with each of the chambers in the vaporization zone.

12. In an alkylation process wherein an isoparaffin is reacted with an olefin in the presence of sulfuric acid in an alkylation zone, the sulfuric acid becomes spent as it is contaminated with organic by-products and hydrocarbons during the course of the reaction and the spent sulfuric acid is withdrawn when it is deactivated at a concentration less than 96 percent by weight acid, the improvement for regenerating the acid catalyst which comprises: passing the contaminated spent acid to an absorption chamber of a first vaporization zone maintained under a pressure of from about 15 mm. Hg to about 150 mm. Hg; diluting the spent acid with water vapor to a concentration of from about 30 to about 85 percent acid and separating the organic contaminants from the diluted mixture in a decontamination zone to provide a dilute decontaminated acid; passing the decontaminated dilute acid through a separate evaporation chamber of said first vaporization zone at a temperature higher than that of the spent acid in the absorption chamber; vaporizing water from the decontaminated dilute acid to raise its concentration to at least 90 percent acid and condensing these vapors with the spent acid in the absorption chamber; in a separate second vaporization zone, vaporizing water from the decontaminated acid of at least 90 percent concentration under a vacuum of from about 0.5 mm. Hg to about 15 mm. Hg until said acid reaches a concentration of at least 96 percent; passing the vapors from the second vaporization zone through a barometric condensing zone and passing sulfuric acid simultaneously through said condensing zone to condense said vapors; recycling the liquid effluent from the barometric condensing zone to the improvement process; and recovering sulfuric acid of at least 96 percent purity from the second vaporization zone as the product of the process.

13. In an alkylation process wherein an isoparaffin is reacted with an olefin in the presence of sulfuric acid in an alkylation zone, the sulfuric acid becomes spent as it is contaminated with organic by-products and hydrocarbons during the course of the reaction and the spent sulfuric acid is withdrawn when it is deactivated at a concentration less than 96 percent by weight acid, the improvement for regenerating the acid catalyst which comprises: passing the contaminated spent acid to an absorption chamber of a first vaporization zone maintained under a pressure of from about 25 mm. Hg to about 75 mm. Hg; diluting the spent acid with water vapor to a concentration of from about 30 to about 85 percent acid and separating the organic contaminants from the diluted mixture in a decontamination zone to provide a dilute decontaminated acid; passing the decontaminated dilute acid through a separate evaporation chamber of said first vaporization zone at a temperature higher than that of the liquid in the absorption chamber; vaporizing water from the decontaminated dilute acid to raise its concentration to at least 90 percent acid and condensing these vapors in the spent acid in the absorption chamber; in a separate second vaporization zone, vaporizing water from the decontaminated acid of at least 90 percent concentration under a vacuum of from about 1 mm. Hg to about 10 mm. Hg until said acid reaches a concentration of at least 96 percent; passing the vapors from the second vaporization zone through a barometric condensing zone and passing sulfuric acid simultaneously through said condensing zone to condense said vapors; recycling the liquid effluent from the barometric condensing zone to said spent acid in said first vaporization zone; and recovering sulfuric acid of at least 96 percent purity from the second vaporization zone as the product of the process.

14. The process of claim 12 wherein the sulfuric acid passed through said barometric condensing zone is contaminated spent sulfuric acid.

15. The process of claim 12 wherein said spent sulfuric acid passed through said barometric condensing zone is the decontaminated acid of at least 90 percent concentration.

16. The process of claim 12 wherein the sulfuric acid passed through said barometric condensing zone is acid of at least 96 percent concentration.

17. A method for concentrating aqueous sulfuric acid solution of from about 30 to about 85 percent by weight concentration which comprises evaporating water from the said acid solution in a first evaporating zone under a pressure of from about 15 mm. Hg to about 150 mm. Hg; passing the resulting concentrated acid to a second evaporating zone and evaporating water vapor therefrom and absorbing water vapor from said acid in said second evaporating zone in a sulfuric acid solution maintained at a temperature lower than that corresponding to a pressure of from about 0.5 mm. Hg to about 8 mm. Hg; passing colder acid solution containing condensate to the first evaporating zone for concentration therein and recovering concentrated acid from the second evaporating zone.

18. In an alkylation process wherein a paraffin is reacted with an olefin in the presence of sulfuric acid as a catalyst in an alkylation zone, the sulfuric acid catalyst becomes spent as it is contaminated with organic by-products during the course of the reaction, and the sulfuric acid is withdrawn when it reaches a concentration less then 96 percent by weight acid, the improvement for regenerating the spent acid which comprises: passing the spent acid from an alkylation zone in contact with water vapors from a plurality of vaporization zones; diluting the spent acid in a spent acid contacting zone with water vapor to an acid concentration of from about 30 to about 85 percent by weight and separating the organic contaminants from the resulting diluted acid; passing the decontaminated diluted acid through said plurality of vaporization zones in series, continuously vaporizing water from the diluted decontaminated acid under vacuum; allowing the water vapors to pass into said spent acid contacting zone; condensing these vapors in the contaminated spent acid and withdrawing decontaminated sulfuric acid of at least 90 percent acid concentration from said vaporization zone.

19. A method for treating aqueous spent sulfuric acid containing hydrocarbon contaminants having a concentration less than 96 percent acid which comprises concentrating a relatively dilute aqueous sulfuric acid stream in an evaporation zone by evaporation under a vacuum of from 0.5 mm. mercury to about 15 mm. mercury to concentrate said acid stream to at least about 96 percent concentration; removing the resulting vapors from said evaporation zone and, in a separate condensation zone, contacting said vapors under said vacuum with said aqueous spent sulfuric acid having a vapor pressure not higher than that of the boiling acid in the evaporation zone to condense and recover water vapor and sulfuric acid vapor removed from the evaporation zone to dilute the spent acid preparatory to the removal of hydrocarbons from at least a portion of the resulting spent sulfuric acid mixture containing the recovered water and sulfuric acid of the vapors.

20. The process of claim 19 wherein a major portion of the spent acid mixture is recycled as liquid feed to the condensation zone and the remaining portion is separately treated for hydrocarbon removal and concentration.

No references cited.

NORMAN YUDKOFF, *Primary Examiner.*

J. SOFER, *Assistant Examiner.*